March 19, 1957 — B. S. BLAISSE ET AL — 2,785,604
MICROSCOPE OBJECTIVE WITH TWO SPHERICAL REFLECTING SURFACES
Filed Oct. 19, 1954
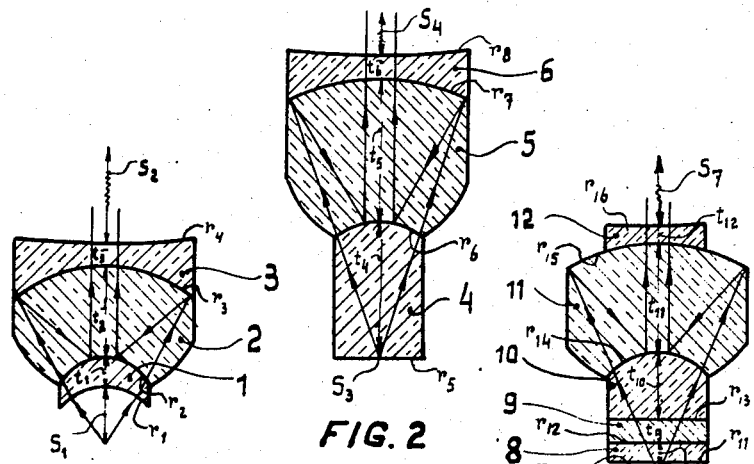
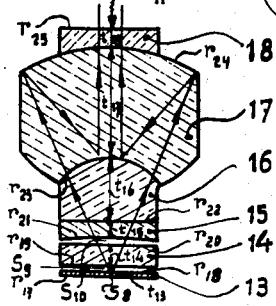
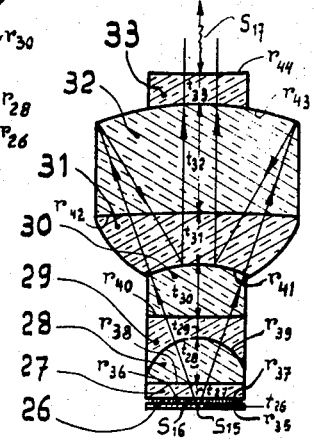
INVENTOR.
B. S. BLAISSE, H. W. BULTHUIS &
BY J. BECKER
Wenderoth, Lind & Ponack
Attys.

United States Patent Office 2,785,604
Patented Mar. 19, 1957

2,785,604
MICROSCOPE OBJECTIVE WITH TWO SPHERICAL REFLECTING SURFACES

Berndt Stephan Blaisse, Voorburg, Henricus Wilhelmus Bulthuis, The Hague, and Johannes Becker, Delft, Netherlands, assignors to N. V. Optische Industrie "de Oude Delft," Delft, Netherlands Application October 19, 1954, Serial No. 463,228

Claims priority, application Netherlands October 28, 1953

7 Claims. (Cl. 88—57)

The invention refers to microscope objectives as in the Netherlands Patent No. 73,427 aiming at further perfection of the latter and particularly at further reduction of the image curvature.

With the above object and other objects in view as will become apparent from the detailed description below, the invention is shown in the drawings, in which:

Fig. 1 shows a microscope objective in section illustrating the type of objective to which the invention is applied.

Fig. 2 is a similar section of a microscope objective illustrating the present invention.

Fig. 3 is a similar section of a microscope objective showing one way in which the under correction for sperical aberration introduced by the objective of Figure 2 is compensated.

Figure 4 is a similar section illustrating a modified system.

Figure 5 is a similar section illustrating another modification, and

Figure 6 illustrates a still further modification.

For this purpose it is necessary to diminish the Petzval sum of the objective. How this is done according to the invention will be described on the basis of Fig. 1, which corresponds to Fig. 1 in the abovementioned patent. If, in this system, surface $r_1$ is constructed flat and the radii of curvature $r_2$, $r_3$ and $r_4$ are then increased by a factor $n$, so that the power and enlargement of the objective are not altered, the Petzval sum of $A/n$ will be reduced to $A/n^2$, where A is the power of the objective and $n$ the index of refraction of the glass of which it is made. The image curvature is thus diminished by a factor $n$.

The objective thus formed is represented in Fig. 2. The flat surface $r_5$ introduces into the objective an undercorrection for spherical aberration, which has to be compensated. According to the invention this is done by interposing between surface $r_5$ and the object at least one optical element in the form of a plane parallel plate or lens with slightly curved external surfaces, the index of refraction of the plate (or, in the case of a lens the index of refraction of a component thereof) being higher than that of the front lens.

The objective thus formed, in the embodiment comprising an optical element in the form of a plane parallel plate, not only has an image curvature which is reduced by the factor $n$, but offers in comparison with the Fig. 1 system additional advantages consisting in the fact that the air cavity between the glass cover and the first surface of the objective in conjunction with the glass cover and the optical element as in the invention does not introduce either coma or astigmatism. Moreover, the aperture of the beams in the glass is reduced by the factor $n$, which feature naturally has an advantageous effect upon the degree of correction. Of course, it is also possible to enlarge the aperture while keeping the degree of correction constant.

In a further embodiment of the objective according to the invention the optical element possesses the form of a doublet containing a component which has an index of refraction greater than that of the front lens. This embodiment is particularly recommended in the case of objectives having a large numerical aperture. The two outer surfaces remain flat or slightly curved, whereas the cemented surface is preferably highly curved. In an advantageous embodiment the cemented surface is so positioned and has such a curvature that rays originating from the axial point of the object fall perpendicular to it, or it is so positioned as to be aplanatic to these rays. The medium on the convex side has a lower index of refraction than the material of the front lens.

If the objective as in the invention is designed as an immersion objective, the additional advantage of a much lesser curvature of the mirror is gained as compared with the immersion objective shown in Fig. 3 of the main patent, since the Petzval sum of the portion of the objective between the object and the cemented surface bearing the convex mirror is, for the same focal length, about 7 times smaller than in the objective shown in Fig. 3 of the main patent.

In the accompanying Figures 3–6 inclusive, some examples of the objective as in the invention are shown in section. The constructional data, comprising the radii of curvature, the thickness of the air cavities and of the lenses, the indices of refraction $n_D$ and the dispersion factors V of the types of glass used, are set forth in the four tables below.

*Fig. 3*

| Element | Radius of curvature of lens surface in mm. | Axial thickness and spacing in mm. | $n_D$ | V |
|---|---|---|---|---|
| Object 0 | | $S_5=0.0$ | 1.0 | |
| | $r_9 = \infty$ | | | |
| coverslip | | $t_7 = 0.19$ | 1.526 | 57.8 |
| | $r_{10} = \infty$ | | | |
| | | $S_6 = 0.25$ | 1.0 | |
| | $r_{11} = \infty$ | | | |
| lens 8 | | $t_8 = 2.50$ | 1.501 | 61.7 |
| | $r_{12} = \infty$ | | | |
| lens 9 | | $t_9 = 3.23$ | 1.691 | 53.8 |
| | $r_{13} = \infty$ | | | |
| lens 10 | | $t_{10} = 8.80$ | 1.501 | 56.5 |
| | $r_{14} = 8.12$ | | | |
| lens 11 | | $t_{11} = 14.27$ | 1.501 | 56.5 |
| | $r_{15} = 22.39$ | | | |
| lens 12 | | $t_{12} = 2.0$ | 1.501 | 61.7 |
| | $r_{16} = 151.36$ | | | |
| image | | $S_7 = 151.36$ | | |

The focal length $f=4.08$ mm. and the numerical aperture is 0.65. The Petzval sum is 0.1024 mm.$^{-1}$.

*Fig. 4*

| Element | Radius of curvature of lens surface in mm. | Axial thickness and spacing in mm. | $n_D$ | V |
|---|---|---|---|---|
| Object 0 | | $S_8=0.0$ | | |
| | $r_{17} = \infty$ | | | |
| coverslip 13 | | $t_{13} = 0.19$ | 1.526 | 57.8 |
| | $r_{18} = \infty$ | | | |
| | | $S_9 = 0.34$ | 1.0 | |
| | $r_{19} = \infty$ | | | |
| lens 14 | | $t_{14} = 3.2$ | 1.691 | 53.8 |
| | $r_{20} = \infty$ | | | |
| | | $S_{10} = 0.1$ | 1.0 | |
| | $r_{21} = 67.61$ | | | |
| lens 15 | | $t_{15} = 2.29$ | 1.501 | 56.5 |
| | $r_{22} = \infty$ | | | |
| lens 16 | | $t_{16} = 8.80$ | 1.501 | 56.5 |
| | $r_{23} = 8.12$ | | | |
| lens 17 | | $t_{17} = 14.27$ | 1.501 | 56.5 |
| | $r_{24} = 22.39$ | | | |
| lens 18 | | $t_{18} = 2.0$ | 1.501 | 61.7 |
| | $r_{25} = 151.36$ | | | |
| image | | $S_{11} = 151.36$ | | |

For this objective the focal length $f=4.15$ mm., the numerical aperture is 0.65 and the Petzval sum is 0.097 mm.$^{-1}$.

Fig. 5

| Element | Radius of curvature of lens surface in mm. | Axial thickness and spacing in mm. | $n_D$ | V |
|---|---|---|---|---|
| object | | $S_{12}=0.0$ | | |
| | $r_{26}=\infty$ | | | |
| coverslip 19 | | $t_{19}=0.19$ | 1.526 | 57.8 |
| | $r_{27}=\infty$ | | | |
| | | $S_{13}=0.15$ | 1.0 | |
| | $r_{28}=\infty$ | | | |
| lens 20 | | $t_{20}=3.77$ | 1.57 | 58.5 |
| | $r_{29}=4.0$ | | | |
| lens 21 | | $t_{21}=1.0$ | 1.565 | 58.0 |
| | $r_{30}=60.0$ | | | |
| lens 22 | | $t_{22}=3.20$ | 1.512 | 60.0 |
| | $r_{31}=7.22$ | | | |
| lens 23 | | $t_{23}=3.36$ | 1.512 | 60.6 |
| | $r_{32}=\infty$ | | | |
| lens 24 | | $t_{24}=9.03$ | 1.501 | 61.7 |
| | $r_{33}=19.61$ | | | |
| lens 25 | | $t_{25}=1.70$ | 1.501 | 61.7 |
| | $r_{34}=154.11$ | | | |
| image | | $S_{14}=154.11$ | | |

The focal length $f=3.7$ mm. and the numerical aperture is 0.9. The Petzval sum is 0.11 mm.$^{-1}$.

Fig. 6

| Element | Radius of curvature of lens surface in mm. | Axial thickness and spacing in mm. | $n_D$ | V |
|---|---|---|---|---|
| object | | $S_{15}=0.0$ | | |
| | $r_{35}=\infty$ | | | |
| coverslip | | $t_{26}=0.19$ | 1.526 | 57.8 |
| | $r_{36}=\infty$ | | | |
| | | $S_{16}=0.15$ | 1.515 | 50.0 |
| | $r_{37}=\infty$ | | | |
| lens 27 | | $t_{27}=1.0$ | 1.88 | 41.3 |
| | $r_{38}=\infty$ | | | |
| lens 28 | | $t_{28}=3.2$ | 1.74 | 44.8 |
| | $r_{39}=3.8$ | | | |
| lens 29 | | $t_{29}=1.4$ | 1.50 | 62.1 |
| | $r_{40}=80$ | | | |
| lens 30 | | $t_{30}=3.6$ | 1.53 | 61.7 |
| | $r_{41}=6.22$ | | | |
| lens 31 | | $t_{31}=3.3$ | 1.51 | 60.6 |
| | $r_{42}=100$ | | | |
| lens 32 | | $t_{32}=7.7$ | 1.50 | 61.7 |
| | $r_{43}=17.23$ | | | |
| lens 33 | | $t_{33}=1.8$ | 1.50 | 61.7 |
| | $r_{44}=156.32$ | | | |
| image | | $S_{17}=156.32$ | | |

The focal length $f=2.45$ mm. and the numerical aperture $=1.3$. The Petzval sum is 0.159 mm.$^{-1}$.

The ratio between the power A and the Petzval sum in these four examples is approximately 2.5, which is in agreement with our basic assertion according to which this factor will have the advantageous value $n^2$. The ratio of 2.5 thus corresponds to a value for $n$ of approximately 1.6.

We claim:

1. An optical system for the enlarged imagery of small objects or for the reduced imagery of large objects comprising in optical alignment from the short conjugate focus towards the long conjugate focus of said optical system spaced spherical surfaces comprising a first refracting surface, a partly reflecting surface, a concave reflecting surface which is concave towards said short conjugate focus, and a second refracting surface exposed to the air, the space between said partly reflecting surface and said concave reflecting surface being filled with transparent material having a refractive index greater than 1, said partly reflecting surface having a central reflecting zone which acts as a convex mirror which is curved in the same sense as and has a shorter radius of curvature than said concave reflecting surface, said partly reflecting surface having a light-transmitting marginal zone which forms an interface between two media with refractive indices greater than 1, said concave reflecting surface having a central light-transmitting zone, the relative position of said spaced spherical surfaces being such that light rays emanating from the short conjugate focus traverse successively said first refracting surface and said partly reflecting surface, are then reflected at said concave reflecting surface back towards said partly reflecting surface, which reflects the rays through said central light transmitting zone of said concave reflecting surface, whereupon said second refracting surface is traversed characterized in that said system has an undercorrection which is compensated by means of at least one optical element in the form of a plane parallel plate, which plate is mounted on the object side of the system and it at least partly made of a material having an index of refraction greater than that of the material situated on the image side of the refracting surface of the system which is located on the object side of the system.

2. An optical system for the enlarged imagery of small objects or for the reduced imagery of large objects comprising in optical alignment from the short conjugate focus towards the long conjugate focus of said optical system spaced spherical surfaces comprising a first refracting surface, a partly reflecting surface, a concave reflecting surface which is concave towards said short conjugate focus, and a second refracting surface exposed to the air, the space between said partly reflecting surface and said concave reflecting surface being filled with transparent material having a refractive index greater than 1, said partly reflecting surface having a central reflecting zone which acts as a convex mirror which is curved in the same sense as and has a shorter radius of curvature than said concave reflecting surface, said partly reflecting surface having a light-transmitting marginal zone which forms an interface between two media with refractive indices greater than 1, said concave reflecting surface having a central light-transmitting zone, the relative position of said spaced spherical surfaces being such that light rays emanating from the short conjugate focus traverse successively said first refracting surface and said partly reflecting surface, are then reflected at said concave reflecting surface back towards said partly reflecting surface, which reflects the rays through said central light transmitting zone of said concave reflecting surface, whereupon said second refracting surface is traversed characterized in that said system has an undercorrection which is compensated by means of at least one optical element in the form of a lens with slightly curved external surfaces, said lens being mounted on the object side of the system and being at least partly made of a material having an index of refraction greater than that of the material situated on the image side of the refracting surface of the sysem which is located on the object side of the system.

3. A microscope mirror system as in claim 2 wherein the optical element is formed by a plane concave lens having its flat side facing the object.

4. A microscope mirror system as in claim 1 wherein the optical element is formed by a doublet having a highly curved cemented surface which is concave on the side facing the object.

5. A microscope mirror system as in claim 4 wherein the rays emanating from the axis point of the object traverse the highly curved cemented surface in a direction approximately perpendicular to that surface.

6. A microscope mirror objective as in claim 4 wherein the rays emanating from the axial point of the object traverse the highly curved cemented surface substantially aplanatically.

7. A microscope mirror system as in claim 2 wherein the optical element is formed by a doublet having a highly curved cemented surface which is concave on the side facing the object.

(References on following page)

References Cited in the file of this patent

UNITED STATES PATENTS

| | | |
|---|---|---|
| 1,724,527 | Spierer | Aug. 13, 1929 |
| 2,097,494 | Lihotzky | Nov. 2, 1937 |
| 2,198,014 | Ott | Apr. 23, 1940 |
| 2,378,301 | Kaprelian | June 12, 1945 |
| 2,520,635 | Grey | Aug. 29, 1950 |
| 2,656,761 | Blaisse | Oct. 27, 1953 |
| 2,707,417 | Bouwers et al. | May 3, 1955 |

FOREIGN PATENTS

| | | |
|---|---|---|
| 680,221 | Great Britain | Oct. 1, 1952 |